United States Patent [19]

Zahra et al.

[11] 4,333,533
[45] Jun. 8, 1982

[54] WEEDER FOR ROW CROPS

[76] Inventors: Frank G. Zahra; Johann V. Binder, both of Cardier Rd., Wangan, Australia, 4860

[21] Appl. No.: 211,853

[22] Filed: Dec. 1, 1980

[51] Int. Cl.³ ............................................. A01B 39/18
[52] U.S. Cl. ................................. 172/155; 172/508; 172/657
[58] Field of Search ............... 172/657, 624, 508, 509, 172/643, 639, 155, 159, 651, 512, 513

[56] References Cited

U.S. PATENT DOCUMENTS

| 1,074,444 | 9/1913 | McArthur | 172/643 X |
| 1,761,491 | 6/1930 | Plein | 172/624 X |
| 2,304,671 | 12/1942 | Bayless | 172/624 |

FOREIGN PATENT DOCUMENTS

10684/32 12/1932 Australia.
20423/34 12/1934 Australia.
145396 1/1951 Australia.

Primary Examiner—Richard J. Johnson
Attorney, Agent, or Firm—Schwartz, Jeffery, Schwaab, Mack, Blumenthal & Koch

[57] ABSTRACT

A weeder for row crops has a main frame adapted to be mounted at the rear of a tractor. A pair of upright skid boards, spaced at the front and rearwardly divergent, are adjustably interconnected so that their spacing and angular relationship may be varied, and are mounted on the main frame for lateral movement relative to the main frame. When the weeder is advanced the skid boards travel to both sides of the plants and in the furrow in which they are planted, throwing to both sides the soil and uprooting weeds in the furrow, into which the loose soil falls as the implement passes.

5 Claims, 4 Drawing Figures

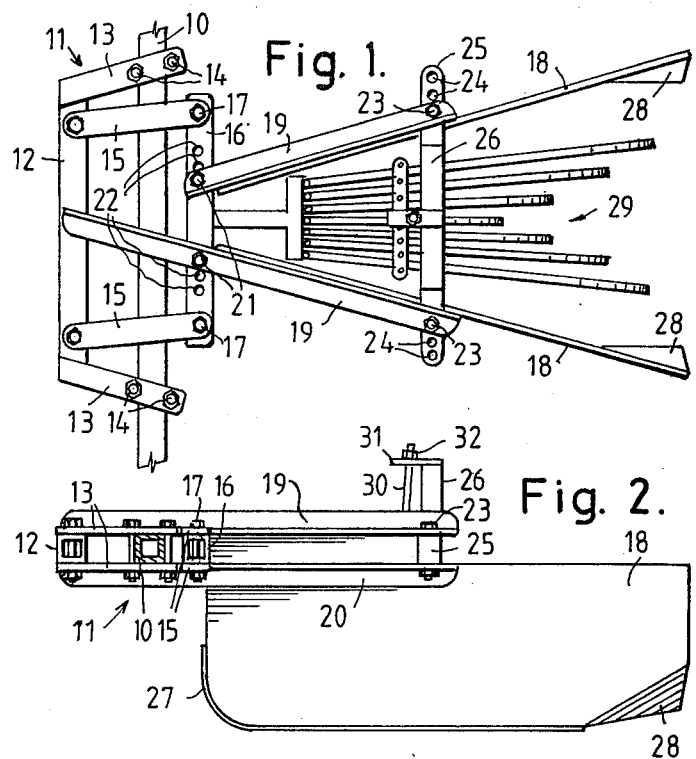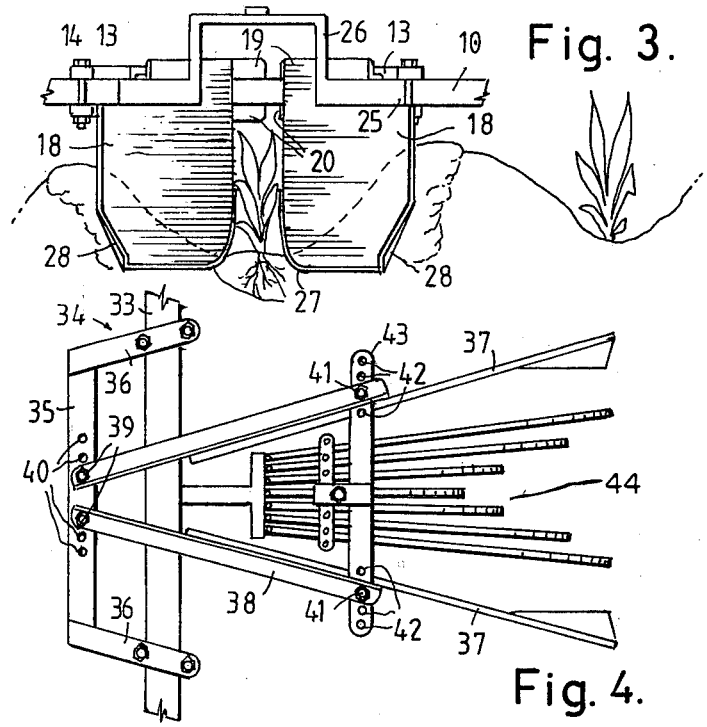

WEEDER FOR ROW CROPS

BACKGROUND OF THE INVENTION

This invention relates to a weeder for row crops.

Certain row crops, such as sugar cane, are normally planted in deep furrows, and to destroy the weeds which grow in these furrows around the sugar cane plants involves a good deal of difficulty. Various tractor-drawn implements have been devised for this purpose, but the use of such implements calls for very considerable skill, and the operation is very time consuming, as the weeding must be carried out drill by drill.

The general object of the present invention is to provide a weeding implement capable of destroying weeds around row crops, even when the plants are in deep furrows, without any likelihood of damaging the root systems of the plants, and without any high degree of skill being required. An implement according to the invention may be capable of operating simultaneously in two or more drills, even if the spacing of these is uneven, and so a great deal of time and labour may be obviated.

SUMMARY OF THE INVENTION

With the foregoing and other objects in view, the invention resides broadly in a weeder including a main frame for attachment to a tractor, and a pair of upright skid boards, laterally spaced at the front and rearwardly divergent, mounted on the main frame for limited lateral movement and so made and arranged that, when the tractor-drawn main frame is advanced, the skid boards travel in a furrow and to both sides of the plants of the row crop, throwing to both sides the soil and uprooting weeds in the furrow into which the soil may fall as the implement passes. A scratcher or weeder of any suitable type may be mounted between the skid boards to destroy weeds and grass growing directly between the plants. Two or more such assemblies may be mounted in laterally spaced arrangement on a common tool bar of the main frame, for weeding a number of rows simultaneously, and the spacing of the fronts, and also of the backs, of each pair of skid boards may be adjustably variable. Other features of the invention will become apparent from the following description.

BRIEF DESCRIPTION OF THE DRAWINGS

In the accompanying drawings:

FIG. 1 is a plan view of a weeding implement according to the invention,

FIG. 2 is a side elevational view of the implement,

FIG. 3 is a rear elevational view of the implement in operation, and

FIG. 4 is a plan view of an alternative embodiment of the invention.

DETAILED DESCRIPTION OF THE PREFERRED EMBODIMENT

The weeding implement shown in FIGS. 1, 2 and 3 of the drawings includes a main frame, of which only the transverse tool bar 10 is shown, the main frame including also well-known means (not shown) for connection to the three-point lifting mechanism of a tractor.

Secured at adjustable lateral intervals to the tool bar 10 are a number of mounting frames 11, one only of which is illustrated. Each of these mounting frames includes a transverse front member 12 ahead of and parallel to the tool bar 10, to which it is secured by two rearwardly divergent pairs of attachment arms 13 extending from the sides of the front member 12, those of each pair passing over and under the tool bar and being clamped thereto by bolts at 14.

Pivoted near to the sides of the front member 12 are two pairs of upper and lower links 15, which pass slidably over and under the tool bar 10, and over and under the sides of a transverse carrier bar 16 to which they are pivoted at 17, so that the carrier bar is permitted free movement to one side or the other in parallelism.

The weeder includes a pair of skid boards 18 which are upright, are of greater length than height, and are spaced apart at their front ends, and are rearwardly divergent. A pair of upper and lower angle iron members 19 and 20 are secured longitudinally to the upper front part of each of the skid boards 18. Both pairs of members 19 and 20 project forwards from the skid boards, each pair being secured by a bolt 21 through them and through any selected one of a series of holes 22 in the carrier bar 16. The angle iron members 19 and 20 of one pair are longer than those of the other pair, and they extend forwardly over and under the tool bar 10 to prevent undue vertical play of the skid board assembly; if desired they may be continued further forward, so their front parts are over and under the front member 12. The rear ends of each of the two pairs of angle iron members 19 and 20 are secured in laterally adjustable manner by a bolt 23 through their rear parts and any selected one of a series of holes 24 in a transverse spacer bar 25 which is formed with a central arch at 26. The two skid boards 18, then, are rearwardly divergent, but the spacing of their fronts, and the angle of divergence, are both adjustable. For rigidity a diagonal brace (not shown) may, if desired, be installed between the two skid boards.

Each of the skid boards 18 has a rounded lower front corner, and a replaceable wear strip 27 is applied around this corner and to the bottom of the skid board. The bottom rear corners 28 of the two skid boards are bent towards each other along oblique lines, so that their bottom edges are more or less parallel to the direction of travel.

A weeder or scratcher 29 of any suitable type, and omitted from FIG. 3, is mounted between the skid boards 18, being attached centrally to the carrier bar 16, passing under the arch 26 of the spacer bar 25, and being suspended in vertically adjustable manner from this arch by a support rod 30 passing up through a bracket 31 on the arch and engaged by an adjustment nut 32.

In use, as the implement is advanced, each pair of skid boards 18 rides in a furrow, as shown in FIG. 3, the assembly centering itself in relation to its furrow owing to the construction and arrangement of the skid boards, and the lateral movement in parallelism which the assembly is permitted. The skid boards of each pair pass to both sides of the plants 33 without causing damage to the roots, and the soil in which the weeds are growing is turned over and outwards by the skid boards, to fall back into place after the implement has passed. The weeder or scratcher 28 destroys weeds and grass growing directly between the plants.

Where the spacing of the furrows is very regular, the rather simplified modification of the invention shown in FIG. 4 will be found satisfactory. In this form of the invention, the pairs of links 15 and the carrier bar 16 before described with reference to FIGS. 1, 2 and 3 are omitted. The implement tool bar 33 has a number of mounting frames 34 (one only being shown) each consisting of a transverse front member 35 secured in front of and parallel to the tool bar by attachment arms 36. The skid boards 37, similar to those before described, are secured to pairs of parallel upper and lower angle iron members 38 which pass slidably above and below the tool bar 33, each pair being adjustably pivoted in front by a bolt 39 engaged in any selected one of a series of holes 40 through the front member 35, and adjustably pivoted at the rear by a bolt 41 engaged in any selected one of a series of holes 42 at one side of a transverse spacer bar 43. A vertically adjustable weeder or scratcher 44 between the skid boards is connected in front to the tool bar 33.

In this form of the invention, the rearwardly divergent skid boards are permitted lateral movement, and although they remain rearwardly divergent, such movement is not in parallelism. However, with regularly spaced furrows, the lateral movement of the skid boards of any of the assemblies on the common tool bar will be quite small and the implement will be found to be effective in operation.

We claim:

1. A weeder comprising:
 a main frame for attachment to a tractor;
 a fixed transverse member secured to the main frame forwardly of and substantially parallel thereto;
 a movable transverse member rearwardly of and substantially parallel to the main frame;
 two pairs of connecting links pivotally connecting the movable transverse member to the fixed transverse member, the links of each pair passing respectively above and below the main frame, the pairs of links being so arranged that the movable transverse member may move laterally, but with limited vertical movement, relative to the main frame; and
 a pair of upright skid boards being laterally spaced at the front and rearwardly divergent and so constructed and arranged that, when the tractor-drawn main frame is advanced, the skid boards travel in a furrow and to both sides of the plants of a row crop, into which the soil may fall as the weeder passes, the skid boards being laterally movable relative to the main frame as they travel in the furrow.

2. A weeder as claimed in claim 1 wherein the skid boards are adjustably inter-connected in such manner that the spacing of their front parts, and their angle of rearward divergency, may be adjustably varied.

3. A weeder according to claims 1 or 2 wherein the pairs of links are parallel-motion links interconnecting the movable transverse member to the fixed transverse member for lateral movement parallel to the main frame; and the skid boards are secured at their front ends to the movable transverse member.

4. A weeder according to claims 1 or 2 wherein the skid boards are substantially rectangular in side elevation, and the lower rear corner portions of the rearwardly divergent skid boards are inclined, relative to the main parts of the skid boards, to be downwardly convergent.

5. A weeder according to claim 1 further including a scratcher device having a plurality of tynes, said scratcher device being mounted in vertically adjustable manner between the skid boards.

* * * * *